3,391,724
WINDSHIELD COVER
Francis R. Charlesworth, 2119 Underwood St., Lafayette, Ind. 47904
Filed Dec. 15, 1966, Ser. No. 601,983
7 Claims. (Cl. 160—368)

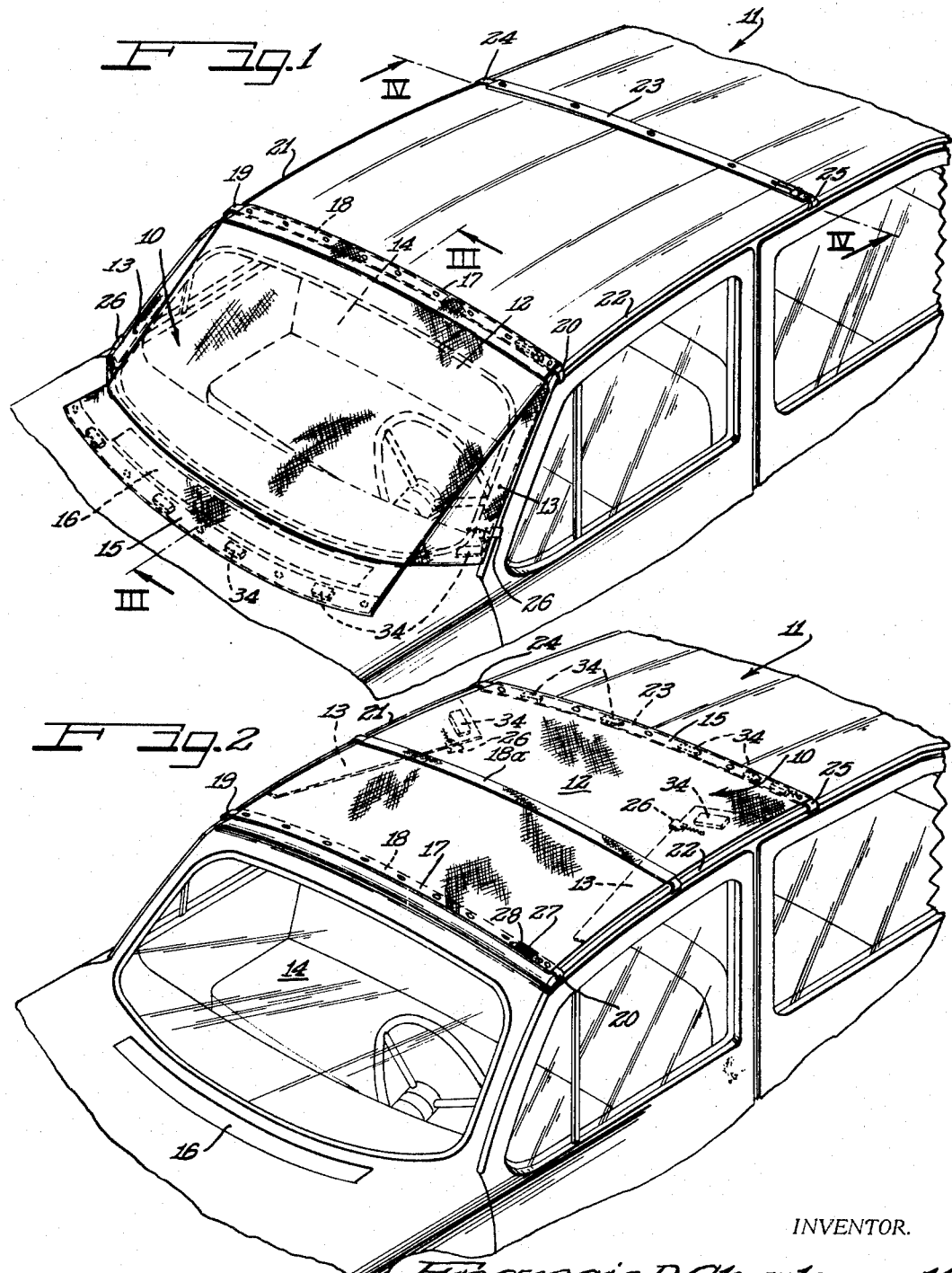

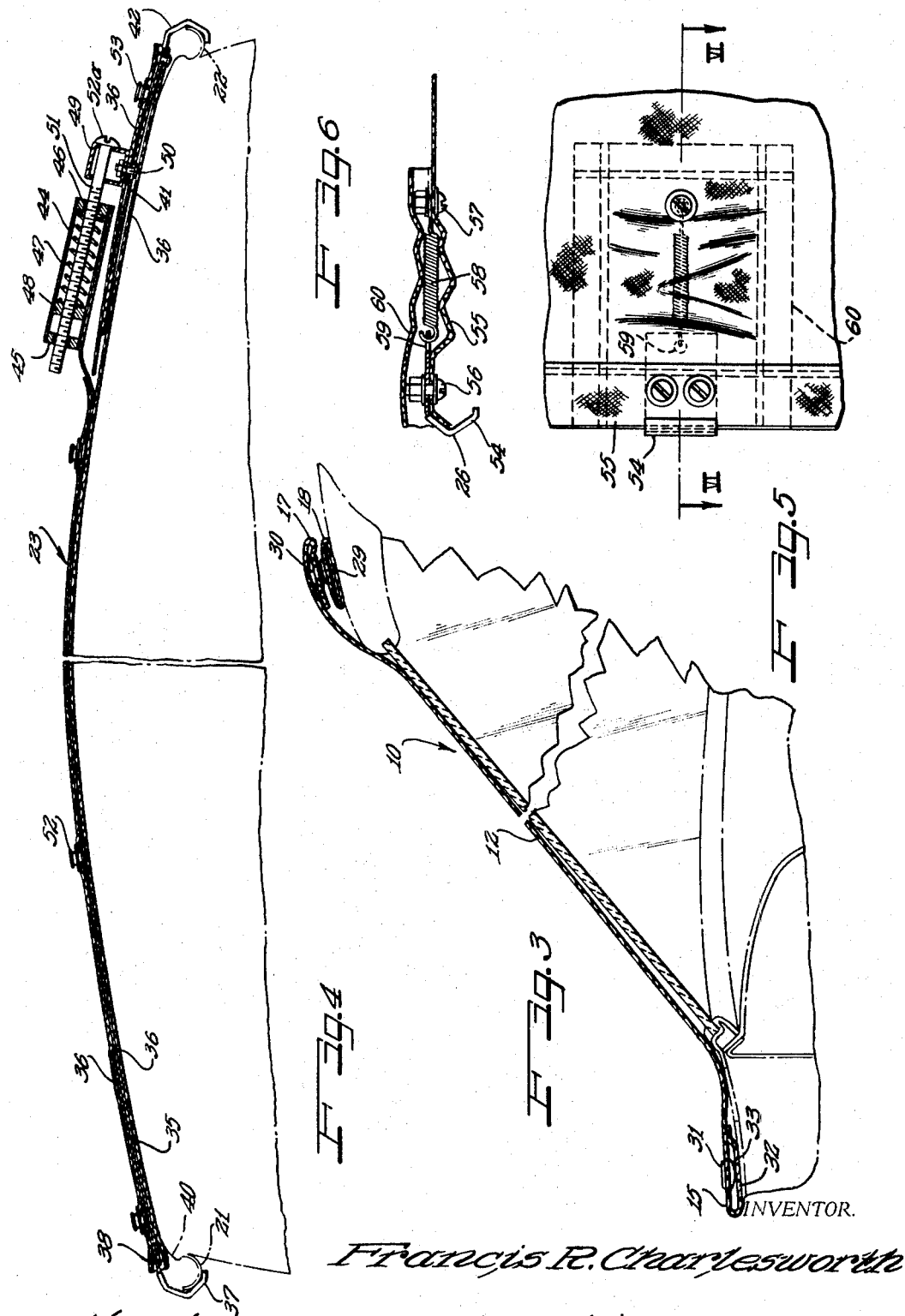

ABSTRACT OF THE DISCLOSURE

A protective cover for automobile windshields, attachable to a flexible strip which is secured to the rain gutters of the vehicle and tensioned by an adjustable tension spring. A second and/or third such strip provides for storage of the cover. Covered spring loaded hooks are secured to the sides of the protective cover to tension the cover across the windshield, the cover including a portion for closing the air-vent opening of the automobile.

BACKGROUND OF THE INVENTION

Field of the invention

This invention relates to automobile accessories and more particularly to protective coverings for vehicle windshields for use when the vehicle is not in operation. The invention more specifically relates to means for attaching said covers to the vehicle and to means for providing for storage of said covers on the roof of the vehicle during operation of the vehicle.

Description of the prior art

Heretofore, protective coverings for automobile windshields have either been of the type loosely placed over the windshield, or of a type anchored in some manner to the automobile. The former have offered little protection during heavy weather and have tended to blow away from the windshield. Further, both that type and those which were attached to the car had to be removed during operation of the vehicle. This removal presented the operator of the car with the problem of storing the cover after removal. During periods of adverse weather when such covers are covered with snow or ice, it is undesirable to place such covers inside the vehicle after removal.

While it has been known in the art to secure the cover from the roof of the car by means of clamps or hooks attached to the rain gutters on either side of the roof, such prior art devices inherently present difficulties in installation and removal.

The present invention avoids these difficulties of the prior art and provides a protective windshield cover which is readily attachable to the vehicle in both windshield protecting and storage positions and capable of being tensioned across the roof of the car between the rain gutters on either side thereof in order to more securely engage the roof of the car.

SUMMARY

The protective windshield cover of this invention includes a piece of water resistant, flexible material such as treated canvas or plastic of a size greater than the windshield to be covered and of sufficient length to extend from a point on the roof rearward of the top of the windshield, downwardly over the face of the windshield to a point on the hood of the car forward of the bottom of the windshield. The bottom portion of the cover preferably extends sufficiently far beyond the bottom of the windshield to cover the windshield wipers and air intake vents located immediately in front of the bottom of the windshield. Fasteners are secured to the cover across the top and bottom ends thereof. These cooperate with compatible means on roof-spanning straps that hold the cover in either its windshield-protecting position or its roof-stored position. The straps are anchored to the rain gutters on either side of the roof of the vehicle and have adjustably spring tensioned draw bolts to tension them across the roof.

Side flaps of substantially triangular shape are attached to the sides of the main portion of the cover to protect the side portions of the wrap-around windshields. Spring-loaded hooks or clamps are attached to the edges of the side flaps for engaging the gutters at the side of the windshield, thus tensioning the cover across the face of the windshield.

In its roof-stored position, the cover is secured to the two flexible tension strips and lies flat against the roof of the car, the two strips being spaced apart substantially the length of the cover. In this stored position, the side flaps of the cover are tucked under the main portion thereof.

When it is desired to place the cover in its windshield protecting position, the bottom or hood end is disengaged from the rearward tension strip and the cover is then folded over the first tension strip and down over the windshield and any air intake vents. The spring loaded hooks on the side flaps are then positioned around the rain gutters at the sides of the windshield.

It is, then, an important object of the invention to provide a protective cover for automobile and the like vehicles' windshields which can be stored on the roof of the automobile.

It is a further object of the invention to provide a protective cover for automobile and the like vehicles' windshields which is attached to the roof of the vehicle by means of a detachable flexible strip tensioned between the rain gutters on either side of the vehicle's roof.

It is a further and more specific object of this invention to provide a protective cover for automobile and the like vehicles' windshields which is attached to the vehicle by means of a flexible strip across the roof of the vehicle and hooked to the rain gutters on either side thereof and tensioned therebetween by means of an integral spring tensioning device.

It is yet another and more specific object of this invention to provide a protective cover for automobile and the like vehicles' windshields with combination spring-hood devices on the sides thereof to tension the cover across the windshield of the vehicle to prevent dislodging of the cover by the wind.

It is still another and more specific object of this invention to provide a protective cover for automobile and the like vehicles' windshields which is attached to the roof of the automobile by a flexible cloth covered strip tensioned across the roof of the automobile by means of an integral spring tensioning device and tensioned across the face of the windshield by means of spring loaded hooks on the sides of the cover which cover also protects the windshield wipers and air intake vents of the automobile.

Many other objects and features of the invention will be apparent from the following description and appended claims.

On the drawings:

FIG. 1 is a fragmentary isometric view of an automobile with the cover of this invention mounted in position over the windshield and air itake vents of the automobile.

FIG. 2 is a view similar to FIG. 1 but showing the cover in its roof-stored position with the side flaps tucked under.

FIG. 3 is a cross sectional view taken along the line III—III of FIG. 1.

FIG. 4 is a cross sectional view taken along the line IV—IV of FIG. 1.

FIG. 5 is an enlarged fragmentary plan view of one of the side flaps spring loaded hooks for the cover showing how it is mounted on the cover.

FIG. 6 is a cross sectional view taken along the lines VI—VI of FIG. 5.

As shown on the drawings:

The protective cover 10 includes a main portion 12 and a pair of side flaps 13. The side flaps 13 are needed only for automobiles having a wrap-around type of windshield 14. The bottom or hood end 15 of the protective cover 10 extends beyond the bottom of the windshield 14 and provides a protective covering for a set of air intake vents 16.

A top or roof end 17 of the protective cover 10 is fastened to a flexible cloth covered strip 18 which has a pair of hooks 19 and 20 at either end engaging a pair of rain gutters 21 and 22 located on either side of the roof of the vehicle 11. A second such cloth covered flexible strip 23 is located across the roof of the vehicle 11 rearwardly of the strip 18. The strip 23 has a pair of hooks 24 and 25 also engaging the rain gutters 21 and 22.

The side flaps 13 have spring loaded hooks 26 attached near their outside edges gripping the rain gutters 21 and 22 and tensioning the protective cover 10 across the face of the windshield 14.

As shown in FIGURE 2, in its roof-stored position, the cover 10 has its top or roof end 17 fastened to the first flexible cloth covered strip 18 while the bottom or hood end 15 is fastened to the second or rearward flexible strip 23. In the roof-stored position, the side flaps 13 are tucked under the main body 12 of the protective cover 10. A portion 27 of the front end 17 of the main body 12 is cut back where it would otherwise overlap an adjustable tensioning device 28 of the flexible cloth covered strip 18. A third such cloth covered flexible strip 18a may be placed over the cover 10 to further reduce vibration of the cover 10 against the roof of the automobile 11 during operation of the automobile at high speeds.

In its roof-stored position, the protective cover 10 lies flat against the roof of the vehicle 11 and the upper or roof end 17 of the main portion 12 is in flat mating engagement with the strip 18.

As shown in FIGURE 3, in its windshield protecting position, the top or roof end 17 of the protective cover 10 is folded forwardly over itself above the strip 18.

The strip 18 has secured to it a plurality of male portions 29 of commercial snap fasteners which mate with a plurality of female portions 30 of such commercial snap fasteners secured through the fabric of the upper or roof end 17 of the protective cover 10. The rearward or second strip 23 likewise is equipped with a plurality of male portions of commercial snap fasteners which mate with a plurality of female portions 31 of commercial snap fasteners which are attached through the fabric of the cover 10 near the edge of the bottom or hood portion 15.

The bottom or hood end 15 is hemmed with a doubled-over portion 32 protecting the automobile's finish from being scratched by a buttonlike end 33 of the female portion 31 of the commercial snap fastener. The male-receiving portions of the female portions 30 and 31 both open on the same side of the fabric of the cover 10.

The hemmed portion of the bottom or hood end 15 of the cover 10 may also carry a number of magnets 34 which hold the end portion 15 over the air intake vents 16 of the automobile 11.

As is shown in FIGURE 4, the flexible cloth covered strips 18 and 23 are constructed of a semi-flexible metal strip 35 which is lined with cloth 36. The strip 35 has a hook 37, which may be rubber coated, secured to one end thereof by means of a rivet 38 or the like fastener. The hook 37 reaches around the rain gutter 21 on one side of the roof of the automobile. The semi-flexible strip 35 extends snugly and closely to the surface of the roof 40 substantially all the way across the car. A much shorter similar semi-flexible cloth covered metal strip 41 is provided with a hook 42 that engages the rain gutter 22 on the opposite side of the car body, the two strips 41 and 35 overlapping or telescoping. The strip 35 has a short section of tubing 44 of square cross section attached to its end and extending in a direction parallel to the strip 35.

The square tubing 44 is closed at both of its ends 45 and 46. A spring 47 and nut 48 are trapped inside with the nut being at that end of the spring which is towards the hook end of the strip 35.

The strip 41 has a square cross section block 49 attached to it by means of a rivet 50 or the like fastener. A bolt 51 with a head 52 extends through apertures in the block 49 through the block 49 with the head 52 bearing against the side of the block 49 which faces in the direction of the hook 42. The body of the bolt 51 extends through an aperture in the end 46 of the square tubing 44 through the spring 47 into the nut 48 and out of the square tubing 44 through an aperture in the end 45. By tightening the bolt 51, the spring 47 is compressed a selected amount, thereby adjustably tensioning the strips 18 and 23 between the rain gutters 21 and 22.

Along the upper surface of the cloth covered strip 35 is disposed a plurality of male portions 52 of commercial snap fasteners and at least one such male portion 53 of a commercial snap fastener is disposed on the upper surface of the shorter strip 41. The fasteners 52 and 53 are secured rivet-like through the fabric of the cloth covering 36 of the strips.

The side flaps 13 have spring-tensioned hooks 26 which are used to tension the cover 10 across the face of the windshield 14. The hooks 26 include a hook-shaped piece 54 of metal, which may be rubber coated, secured in a marginal portion of the fabric 55 of the side flaps 13 by means of nut and bolt fasteners 56 which may be of plastic in order not to scratch the finish of the automobile. Another nut and bolt combination 57 or the like is attached through the fabric 55 in spaced rearward relationship from the fasteners 56. The nut and bolt combination 57 serves as an anchoring post for one end of a coiled spring 58. The other end of the spring 58 is hooked through an aperture 59 in that portion of the metal hook 54 which is secured to the fabric 55, by the fasteners 56. The distance between the aperture 59 and the spring anchoring nut-bolt combination 57 is such that when at rest the spring 58 will pull the hook 54 towards the nut-bolt combination 57, thus bunching up that portion of the fabric 55 which is between the fasteners 56 and the nut-bolt combination 57.

Extension of the spring 58 in the other direction by a force against the hook 54 is limited by the amount of material 55 bunched up. A second piece of fabric 60 is secured over the combination hook and spring 58 to protect the car's surface when the cover 10 is in its roof-stored position. When the cover 10 is in its windshield-protecting position, the spring-loaded hooks 26 engage door posts, frame posts, rain gutters or the like on the sides of the windshield 14 and the tensioning of the spring 58 tensions the cover 10 across the face of the windshield 14. When the protective cover 10 is not supplied with side flaps 13, the spring loaded hooks 26 are attached to the fabric of the main portion 12 of the cover 10.

Although various minor modifications might be suggested by those versed in the art, it should be understood that I wish to embody within the scope of the patent warranted thereon, all such embodiments as reasonably and properly come within the scope of my contribution to the art.

I claim as my invention:

1. A protective cover for vehicle windshields which comprises:

a sheet of protective material for covering a vehicle windshield;

a pair of straps for spanning the roof of the vehicle;

hooks on the ends of said straps for engaging vehicle rain gutters;

spring tensioning means on said straps for drawing said hooks into locking positions with the gutters and for tensioning said straps across the roof of the vehicle; and fasteners secured to said cover and to said straps for selectively attaching the cover to said straps for holding the cover in a stored position on the roof of the vehicle and in a position descending from the roof over the windshield.

2. A protective cover for vehicle windshields which comprises:

strap mounting means including:
first and second strap segments for spanning the roof of the vehicle,
hooks on said segments for engaging vehicle rain gutters, and
adjustable spring tension means connecting said segments for adjustably tensioning said first and second strap segments across the roof of the vehicle;
a windshield cover; and
means along the length of said strap mounting means for detachably connecting said windshield cover to said strap mounting means.

3. The cover of claim 1 wherein said sheet of protective material has an extension for overlapping the windshield wipers and the air intake vents located in front of the windshield of the vehicle.

4. The cover of claim 1 which includes a third strap having hooks at its ends and having a further one of said spring tensioning means for spanning the central portion of said cover in its stored position.

5. A cover according to claim 1, which includes spring-loaded hooks on the sides of said cover engageable with the vehicle rain gutters for holding said cover tautly across the face of the windshield.

6. A cover according to claim 2, in which said adjustable spring tension means comprises:
a hollow housing containing a trapped compression spring and attached to said first strap segment;
a bracket attached to said second strap segment; and
an adjustable bolt and nut assembly acting compressively between said bracket and said spring.

7. A protective cover for vehicle windshields which comprises: windshield protecting means; means for mounting said windshield protecting means on a vehicle; and means for tensioning said windshield protecting means across the face of the windshield which includes hook means attached to the sides of said windshield protecting means, a contracting tension spring having one end attached to the said hook means, the other end of said spring attached to the said protecting means in spaced relationship to the said hook means, said spring acting on the said protecting means to pleat the said protecting means to reduce the width thereof between the said ends, and the expansion of said spring being limited by the fabric of the said protecting means.

References Cited

UNITED STATES PATENTS

| 1,472,651 | 10/1923 | Holling | 160—368 |
| 2,331,600 | 10/1943 | Dillow | 160—368 |
| 2,854,282 | 9/1958 | Nichols | 296—95 |
| 2,907,384 | 10/1959 | Spratt et al. | 160—368 |
| 2,979,129 | 4/1961 | Ketchum | 160—368 |
| 3,184,264 | 5/1965 | Ealey et al. | 296—95 |
| 3,279,845 | 10/1966 | Lutz | 160—368 X |
| 3,336,969 | 8/1967 | Marchman | 160—368 |

DAVID J. WILLIAMOWSKY, *Primary Examiner.*

P. C. KANNAN, *Assistant Examiner.*